United States Patent [19]

Helm

[11] Patent Number: 5,196,824
[45] Date of Patent: Mar. 23, 1993

[54] FLOAT ACTUATED LIQUID LEVEL MONITORING APPARATUS

[75] Inventor: James D. Helm, Murphy, N.C.

[73] Assignee: Oil Monitoring Systems, Inc., Murphy, N.C.

[21] Appl. No.: 694,301

[22] Filed: May 2, 1991

Related U.S. Application Data

[63] Continuation-in-part of Ser. No. 583,572, Sep. 11, 1990, abandoned, which is a continuation-in-part of Ser. No. 277,336, Nov. 29, 1988, abandoned.

[51] Int. Cl.$^5$ .............................................. G01F 23/60
[52] U.S. Cl. ................................. 340/450.3; 340/624; 73/308; 73/322.5
[58] Field of Search .................... 340/623, 624, 450.1, 340/450.2, 450.3, 450; 200/84 R, 84 C, 84 B; 73/305–309, 313, 314, 316, 322.5

[56] References Cited

U.S. PATENT DOCUMENTS

| | | | |
|---|---|---|---|
| 3,113,282 | 12/1963 | Coleman | 73/313 |
| 3,605,086 | 9/1971 | Triska | 340/450.3 |
| 3,637,254 | 1/1987 | Dyben et al. | 340/624 |
| 4,641,523 | 2/1987 | Andreasson | 73/308 |
| 4,724,705 | 2/1988 | Harris | 73/313 |
| 5,020,366 | 6/1991 | Elfverson et al. | 73/308 |

FOREIGN PATENT DOCUMENTS 2187846 9/1987 United Kingdom .................. 73/313

Primary Examiner—Edward L. Coles, Sr.
Assistant Examiner—J. D. Jackson
Attorney, Agent, or Firm—Keck, Mahin & Cate

[57] ABSTRACT

A float actuated resistive oil level display with warning for providing continuous visual indication of oil level in the oil pan of an internal combustion engine. The system includes a reservoir which communicates with the oil pan such that the oil level in the reservoir corresponds to that in the oil pan. A selectively designed float resistor is disposed within the reservoir in such a manner as to compensate for the quantity of oil distributed throughout an engine's lubricating system while it is running, and is part of an electrical circuit which includes a meter and an alarm circuit remotely positioned within the view of the operator of the motor vehicle or other device powered by the engine to provide a continuous visual indication of oil level in the oil pan, even while such motor vehicle or other device is being operated.

10 Claims, 5 Drawing Sheets

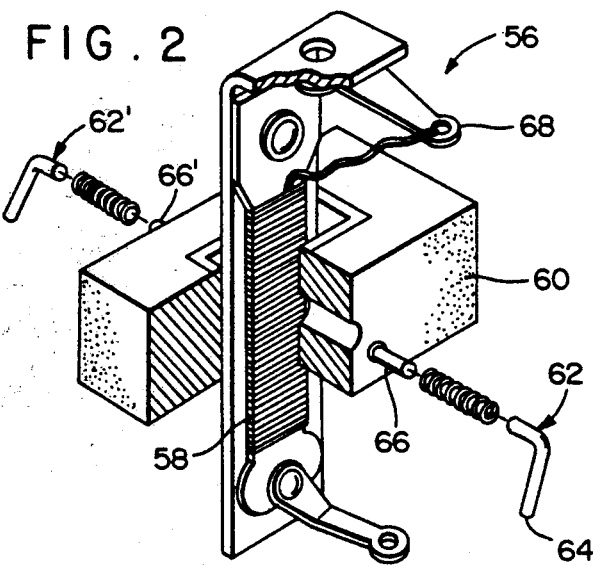
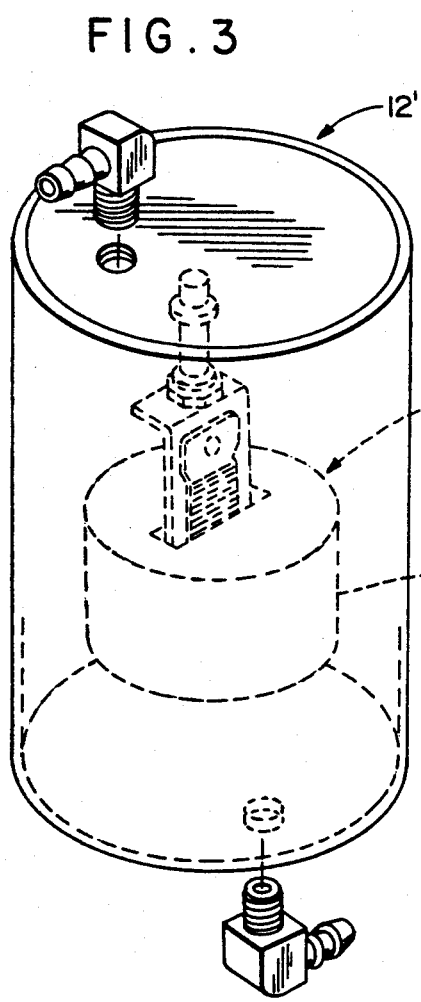
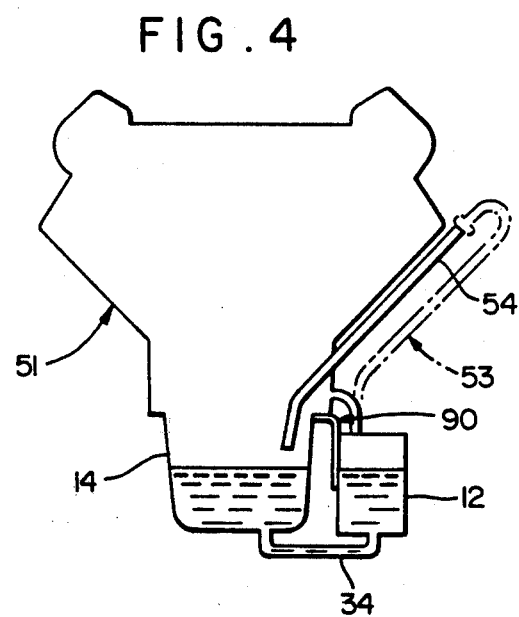
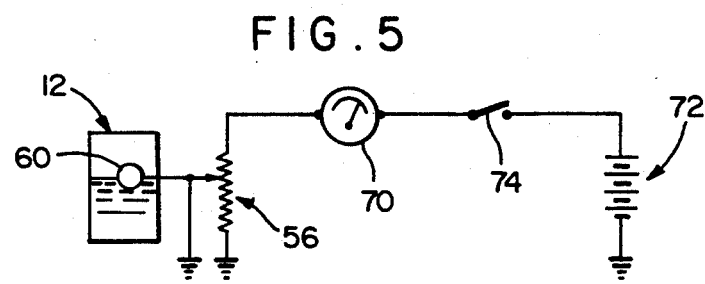

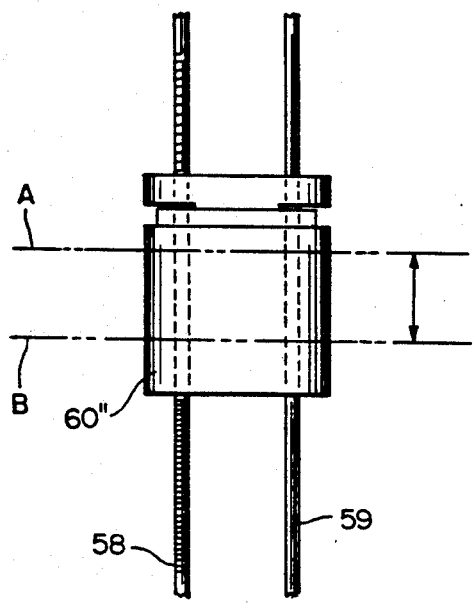
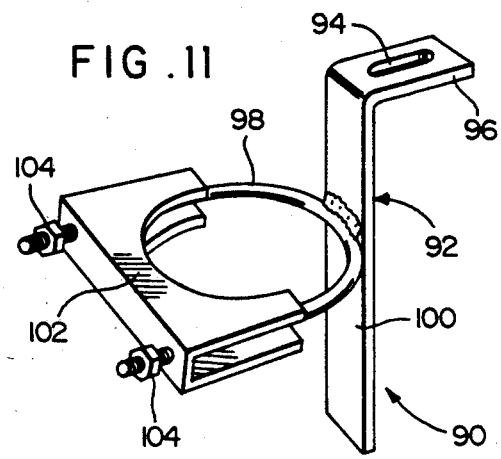
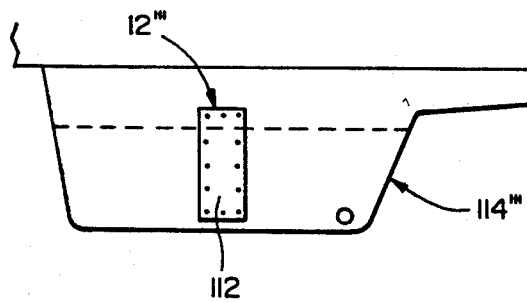
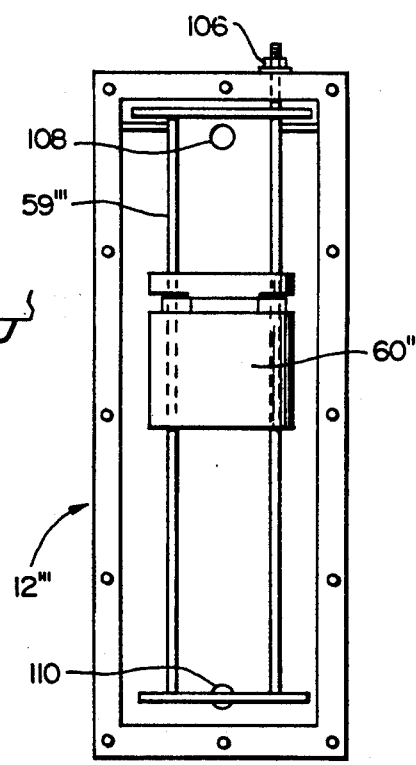

FLOAT ACTUATED LIQUID LEVEL MONITORING APPARATUS

This is a continuation-in-part application of application Ser. No. 07/583,572 filed Sep. 11, 1990, now abandoned which is itself a continuation-in-part of application Ser. No. 07/277,336 filed Nov. 29, 1988, now abandoned.

TECHNICAL FIELD

The present invention relates to liquid level monitoring devices in general and more particularly concerns an improved device for providing a remote display of the quantity or level of oil in an oil pan or crankcase of an internal combustion engine or in the oil pan of a vehicle transmission, gearbox or the like or other hydraulic system. In general, the invention is applicable to any system in which a liquid level is to be monitored including vehicle fuel tanks and the like.

BACKGROUND ART

The need to maintain, for example, the proper level of oil in an internal combustion engine is well known. Low oil levels can cause excessive wear and can even cause engine failure when such levels are exceedingly low. Most internal combustion engines are provided with a dipstick for checking the oil level in the oil pan of the engine. While the conventional dipstick provides an accurate indication of oil level when the engine is not running, it is virtually useless when the engine is running because of the turbulence and agitation of the oil in the oil pan. The necessity of shutting the engine down to check the oil level can be a significant problem with diesel engines in cold weather, because such engines are difficult to restart. Obviously, in the case of a motor vehicle, the dipstick is of no use at all while such vehicle is being operated. Further, many operators forget to check the dipstick before oil quantities have dipped to dangerously low levels. This can be a particular problem with over-the-road trucks which are driven hundreds of miles per day. In addition, a dipstick (which can only be used with the vehicle or other machine stopped and the engine shut down) does not provide any early warning of a major oil leak.

Many internal combustion engines are provided with oil pressure gauges and/or warning lights which indicate low oil pressure. While these devices will provide indication of very low oil levels, such as those caused by major leaks, the oil level has usually fallen to a level where the engine is being damaged before such indication is apparent. Moreover, such prior art devices generally only operate when the engine is running.

Prior art oil level monitoring devices have been provided which comprise oil level sensing units which are disposed in the conventional dipstick tube and/or the oil pan of an internal combustion engine. Some examples include those devices disclosed in U.S. Pat. Nos. 4,337,657 and 4,034,608. While these devices can provide an indication of oil level when the engine is not running, they, like the conventional dipstick, are inaccurate when the engine is running because of the agitation of the oil in the oil pan, and moreover, they do not take into account and compensate for the quantity of oil which is in circulation when the engine is running.

Other approaches to a solution of this problem include attaching a separate reservoir to an oil pan, the reservoir containing a mechanism for monitoring the oil level therein. U.S. Pat. No. 3,605,086 is one example of this art. However, prior to the present invention, devices using this type of art still contained an inherent inaccuracy, that being the difference between the level of oil in the pan with the engine running, with a quantity of oil being dispersed throughout the engine lubricating system, and the increased level present with the engine not running and the previously dispersed oil having been returned to the pan.

Therefore, it is a principal object of the present invention to provide an oil level monitoring device which is capable of providing a continuous indication of oil level in the oil pan of an internal combustion engine, (or other mechanical or hydraulic system) even when the engine is running and the vehicle or other device it powers is being operated.

It is a further object of the present invention to provide such an oil level monitoring device which will maintain its accuracy and compensate for the difference between the level of oil in a pan when an engine is running and that when the engine is not running.

DISCLOSURE OF THE INVENTION

Other objects and advantages will be accomplished by the present invention which provides a float actuated resistive liquid level monitoring device for use with an internal combustion engine or other system. The device includes a reservoir which may be mounted internally or externally on the engine or the like, and, in the preferred embodiment, secured to the engine in an adjustable manner. Fluid communication is provided between the oil pan of the engine, proximate a point suitably below the recommended oil level in the oil pan, and the reservoir, proximate the bottom of the reservoir. The reservoir is positioned such that oil will flow into the reservoir from the oil pan and seek the same level in the reservoir. The reservoir comprises a closed volume, the top of which is high enough to provide an air volume above the oil in the reservoir. For an externally mounted reservoir, the top of the reservoir is vented back to the internal volume of the engine proximate a point suitably above the oil level in the oil pan of the engine such that the atmospheric pressure above the oil in both the oil pan of the engine and the reservoir remain the same. It will be appreciated by those skilled in the art that the oil level in the reservoir will correspond to that in the oil pan.

An oil level dependent variable resistance is provided for connection in an electrical circuit which may include an electrical power source, typically the battery of the vehicle or other machine in which the internal combustion engine is installed, and a remotely mounted electrical display means, such as a meter or gauge, which provides visual indication of the oil level in the reservoir and thus the oil level in the oil pan. In a preferred embodiment, the oil level variable resistance comprises a fixed resistance member and a float member equipped with electrical contacts. The fixed resistance member is composed of a length of resistance wire which may be so wound as to provide areas in which the resistance between windings varies at a different rate from that of another area. When this resistor and float are disposed within the reservoir, the float, through its electrical contact with the resistor, senses the changes in electrical resistance created as the oil level in the reservoir moves the float up and down. The difference in the rate at which the resistance near the top relative to that near the bottom may vary so that the movement of the float in a near full oil pan senses less resistance change, tending to negate the changes in quantity of oil occasioned by the removal and drainage back into the pan of the oil dispersed throughout the system when the engine is running. In a preferred embodiment, the float and the contacts through which it engages the resistor may be designed so that when the engine is started and a quantity of oil is distributed throughout the lubrication system, the float will not immediately descend with the lowering oil level, but will remain at the top of its travel until such time as the oil level is lowered by a further amount representative of a true usage or loss of oil from the engine.

When the system of the present invention is used in conjunction with a motor vehicle, the meter can be mounted in the passenger compartment of the motor vehicle within the view of the driver thereof to provide a continuous visual indication of oil level in the vehicle's engine.

In other systems, the monitoring device may be used to generate signals for transmission, by satellite or other means to remote receivers, for example for monitoring oil or fuel levels in commercial vehicles, from a remote centralized location.

BRIEF DESCRIPTION OF THE DRAWINGS

The above-mentioned features of the present invention will become more clearly understood from the following detailed description read together with the drawings, in which:

FIG. 2 illustrates a perspective view of a float resistor which can be used in a float actuated resistive oil level monitoring system constructed in accordance with the various feature of the present invention.

FIG. 3 illustrates an alternate embodiment of a float actuated resistive oil level monitoring system constructed in accordance with the various feature of the present invention.

FIG. 4 diagrammatically illustrates the communication between the reservoir of the float actuated resistive oil level monitoring system of the present invention and the oil pan of the internal combustion engine with which the system can be used.

FIG. 5 is a simplified schematic of the electrical circuitry of the present invention where, for purposes of illustration, the resistor 58 is shown outside of the reservoir 12.

FIG. 10 is an elevational view of the float in use illustrating the manner in which it compensates for oil circulating in an engine.

FIG. 11 is a perspective view of a mounting bracket for the reservoir shown in FIG. 6.

FIG. 12 is a diagrammatic side elevational view of an engine oil pan showing an internally mounted reservoir for an oil monitoring system according to the invention.

FIG. 13 is an enlarged sectional elevational view of the internally mounted reservoir.

BEST MODE FOR CARRYING OUT THE INVENTION

Figure 1:
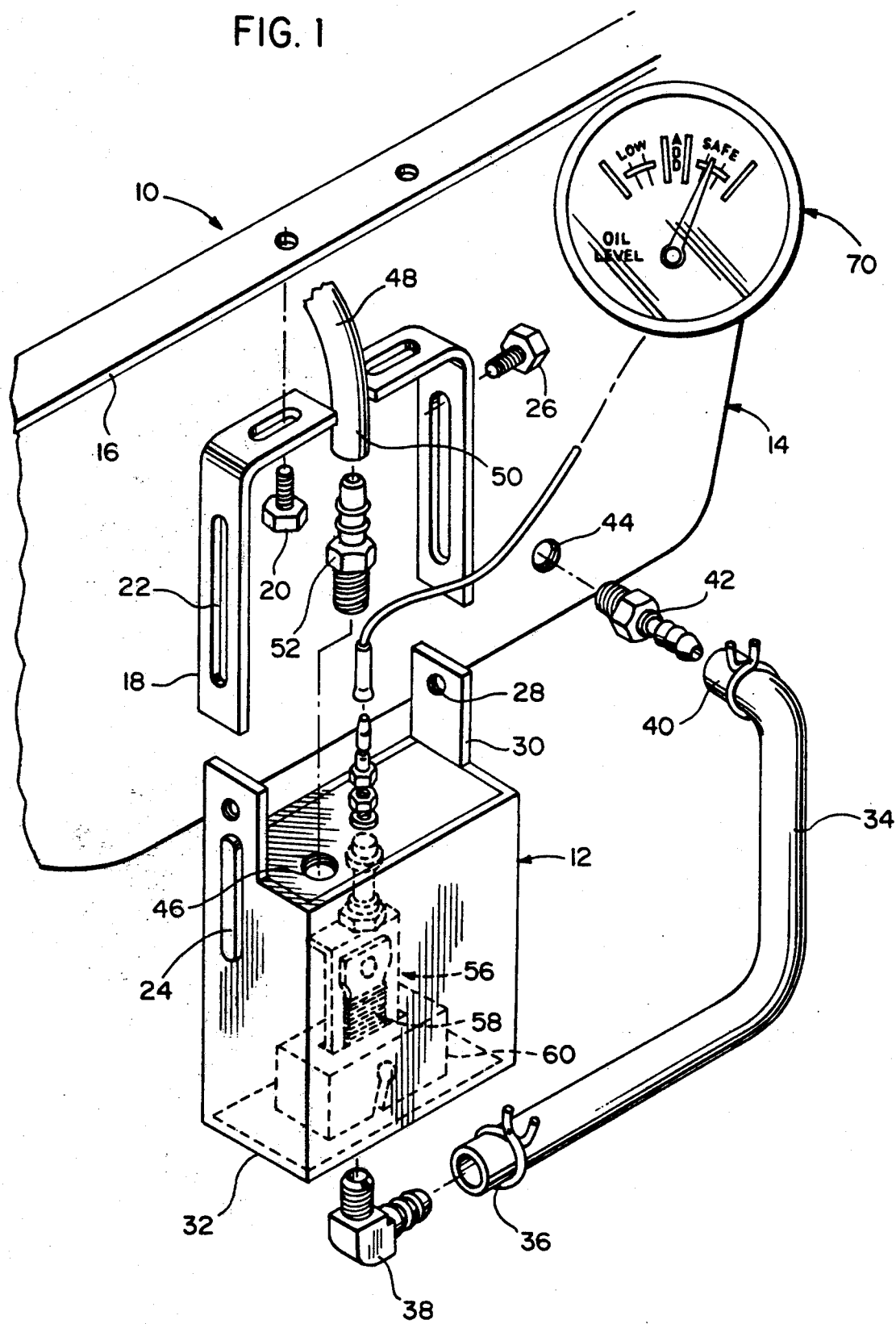
FIG. 1 illustrates a perspective view of a float actuated resistive oil level monitoring system constructed in accordance with the various features of the present invention.

Referring firstly to FIGS. 1 to 5, an oil level monitoring system incorporating various features of the present invention is illustrated generally at 10 in the figures. The system 10 includes a reservoir 12. Referring to FIG. 1, the reservoir 12 is secured to the lip 16 of the oil pan 14 of an internal combustion engine. However, it will be appreciated by those skilled in the art that the reservoir 12 can be secured to another location proximate the oil pan 14 so long as the vertical range of elevation of the interior volume of the reservoir 12 corresponds to the vertical range of elevation of the oil level in the oil pan 14.

The reservoir 12 can be secured to the lip 16 of the oil pan 14 with the bracket 18 with one or more fasteners 20. The bracket 18 is provided with a pair of elongated vertical openings 22 for receiving a corresponding detent 24 provided on either side (one side only is shown) of the reservoir 12. The openings 22 are substantially longer than the detents 24 to permit vertical adjustment of the reservoir 12 within the bracket 18. At least one vertical adjustment screw 26 is provided which is received through at least one of the openings 22 into the opening 28 in the reservoir support members 30 and is used to secure the reservoir 12 to the oil pan 14 at a desired position of elevation.

Still referring to FIG. 1, fluid communication is provided between the lower portion of the oil pan 14 and the bottom 32 of the reservoir 12 by a length of flexible tubing 34. The first end portion 36 of the tubing 34 is connected in fluid communication with the reservoir 12 by a fitting 38 which is received by an opening (not shown) in the bottom 32 of the reservoir 12. The second end portion 40 of the tubing 34 is connected in fluid communication with the lower portion of the oil pan 14 by a fitting 42 which is dimensioned to be received within the opening 44 in the oil pan 14. The opening 44 should be positioned in the oil pan 14 at a point substantially below the normally operating level of oil in the oil pan and can comprise the oil pan drain opening (normally provided in an internal combustion engine) by replacing or modifying the usual plug with the fitting 42.

The top of the reservoir 12 is provided with an opening 46 for venting the reservoir 12 back to the crankcase or oil pan of the internal combustion engine above the level of oil in the oil pan 14. It is important to vent the top of the reservoir back to the crankcase of the engine so that the atmospheric pressure above the oil level in the reservoir 12 is the same as that above the oil level in the oil pan 14. It will be appreciated that this will permit the oil in the oil pan 14 to flow through the length of tubing 34 into the bottom of the reservoir 12 until it reaches the same level in the reservoir 12 as in the oil pan 14; i.e. the top of the volume of oil in the reservoir 12 is at the same elevation as the top of the volume of oil in the oil pan 14. A length of flexible tubing 48 is provided to accomplish the venting back of the reservoir 12. The proximal end portion 50 of the tubing 48 communicates with the opening 46 via a fitting 52 which is received by the opening 46. The distal end portion (not shown) of the tubing 48 communicates with the internal atmosphere of the engine above the oil level in the oil pan 14. This can be accomplished by providing an opening in the oil pan 14 above the oil level and an appropriate fitting for communicating with such distal end portion of the tubing 48, or, alternatively, the opening of the dipstick tube (not shown, but normally provided with an internal combustion engine) can be provided with an appropriate fitting for communicating with the distal end portion (not shown) of the tubing 48. Referring to FIG. 4, a diagrammatic illustration of how the oil level in the reservoir 12 matches that in the oil pan 14 of an internal combustion engine 51 is shown. The broken line shown at 53 in FIG. 4 illustrate the alternate positioning of the vent tube 48 described above (for venting the reservoir 12 back to the dipstick tube 54 of the engine 51).

Referring now to FIGS. 1 and 2, a liquid level dependent variable resistance, shown generally at 56, is provided within the interior volume defined by the reservoir 12. The variable resistance 56 comprises a resistor member 58 which is fixedly secured within the reservoir 12 and a float 60 which is disposed around the resistor member 58 as illustrated. An electrical terminal member 62 is carried by the float 60. the proximal end 64 of the terminal member 62 is electrically connected to one terminal of the vehicle or other device's electrical system, typically the negative terminal, by connecting it to the vehicle or other device's chassis ground. The distal end 66 of the terminal member 62 is spring biased into mechanical an electrical contact with the resistor 58 along its length, depending upon the vertical position of the float 60. Referring to FIG. 2, the variable resistance 56 includes a second terminal member 62' on the side of the resistor 58 opposite that on which the terminal member 62 is installed. The terminal members 62 and 62' are substantially identical in construction with the proximal end 64' of the member 62' also being electrically connected to the chassis ground of the device's electrical system. Providing two terminal members 62 and 62' provide a more reliable electrical connection between ground and the resistor 58 at selected points along its length. The resistor 58 is provided with a stop member 59 which prevents the float 60 from falling below a selected point along the length of the resistor 58 regardless of the level of liquid in the reservoir 12. The stop member 59 can be either grounded or ungrounded without affecting the operation of the system. The terminal 68 is electrically connected to the uppermost end of the resistor 58 which is of the wound wire type. It will be appreciated by those skilled in the electrical arts that as the oil level in the reservoir 12 increases, the float 60 will rise with respect to the resistor 58 and the electrical resistance between the terminals 62 and 68 will decrease as less and less of the resistance of the resistor 58 is "tapped-off". The terminal 68 is electrically connected to one terminal of the meter 70 which, when the system 10 is used in conjunction with a motor vehicle, can be positioned in a convenient location in the passenger compartment of the vehicle within the view of the driver. The other terminal of the meter 70 is electrically connected to the ungrounded terminal of the battery of the vehicle or other device's electrical system, usually through contacts which are closed only when the vehicle's ignition switch is in the "ON" or "ACCESSORY" position, to form a complete electrical circuit. When the system 10 is used with an internal combustion engine which does not have an associated ignition switch, such as a diesel engine, other switch means (see 74, FIG. 5) can be provided as desired for opening the electrical circuit of the system 10 when the engine is not running or the device it powers is not being operated. The deflection of the needle of the meter 70 is a function of the current through it which in turn is related to the resistance of the variable resistor 56. Accordingly, the deflection of the needle of the meter 70 will increase as the oil level in the reservoir 12 increases. FIG. 5 illustrates a simplified schematic of the electrical circuitry of the present invention, where, for purposes of illustration, the resistor 56 is shown outside of the reservoir 12. In FIG. 5, the vehicle or other device's battery is indicated by the reference numeral 72 and switch means for selectively opening the electrical circuit of the system 10, such as a vehicle's ignition switch, is indicated by the reference numeral 74.

In light of the foregoing, an oil level monitoring system 10 has been provided wherein the meter 70 provides a visual indication of the oil level in the engine of a vehicle or other device to the operator of such vehicle or device. The meter 70 can be provided with indicia of when the oil level is within the normal operating range, e.g. "ADD", and when the oil level is substantially below the normal operating range, e.g. "LOW", such as that shown at 76, 78 and 80, respectively, in FIG. 1. The resistor 58 and the meter 70 can be selected/calibrated such that the deflection of the needle of the meter 70 as indicated by the indicia 76, 78 and 80 correlates with the corresponding indicia on the oil level dipstick of the engine. Further, the reservoir 12 can be vertically adjusted in the bracket 18 to obtain the desired needle deflection at any given level of oil in the engine.

Because the oil level is measured in the reservoir 12 instead of the oil pan 14, the resultant indications of level are substantially unaffected by the turbulence and agitation of the oil in the oil pan when the engine is running. This isolation from such agitation is made possible by the relatively small cross-sectional area of the tubing 34 as well as the relative cross-sectional areas of the float 60 and the reservoir 12. Because the float 60 occupies a substantially large portion of the cross-sectional area of the reservoir 12, vertical oscillations of the float 60 are due to surface turbulence of the oil level in the reservoir are minimized. Accordingly, an oil level monitoring system is provided which provides a continuous visual indication of oil level in the engine of a vehicle or other device, even when the engine is running and the vehicle or other device is being operated. This is an important feature of the present invention because even a conventional dipstick does not provide accurate indication of oil level when the engine is running, and certainly cannot be used which a vehicle is moving.

An alternate construction of the system of the present invention is illustrated in FIG. 3 in which the reservoir 12' is cylindrically shaped as opposed to the rectangular shape of the reservoir 12 shown in FIG. 1.

Figure 6:
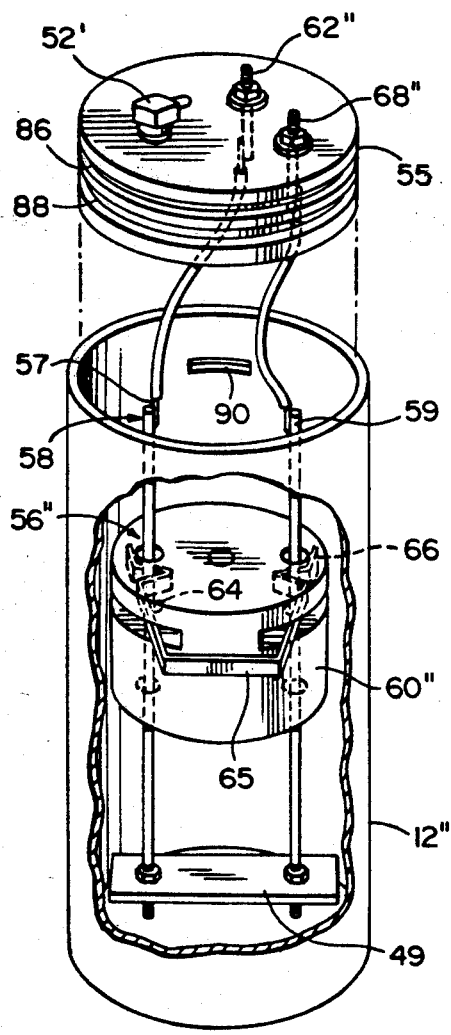
FIG. 6 is a somewhat diagrammatic exploded perspective view of a further form of reservoir for an oil monitoring system according to the invention.
Figure 7:
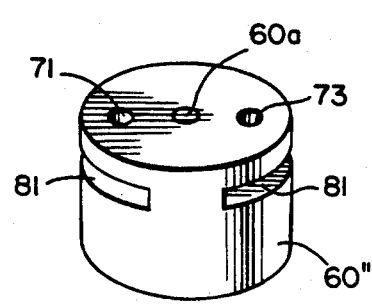
FIG. 7 is a perspective view of a float for use in the reservoir of FIG. 6.
Figure 8:
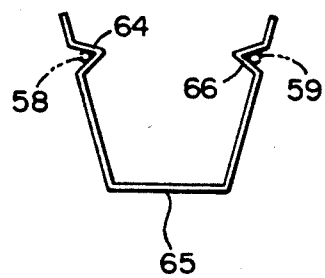
FIG. 8 is a plan view of an electrical connector for use in the float.

A further alternative construction of the system of the present invention is illustrated in FIGS. 6-11, in which the reservoir 12" is again cylindrically shaped as opposed to the rectangular shape of the reservoir 12 shown in FIG. 1, and a liquid level dependent variable resistance, shown generally at 56", is provided within the interior volume defined by the reservoir 12". The variable resistance 56" comprises a resistor member 58 and a float member 60", together with an electrical terminal member 65, which is carried by the float 60 and is spring biased to be in mechanical and electrical contact with the resistor 58 and a ground rod 59 as shown in FIG. 6.

Resistor 58 comprises a wire wound type resistor of fixed resistance value created by wrapping a selected number of turns of resistance wire around a core such as the rod 57. In this exemplary case of the present invention, an upper portion 61 of resistor 58 has been wrapped with the turns of resistance wire spaced further apart than the lower portion 63. The upper end of rod 57 is mechanically supported by reservoir cover 55 and arranged so as to be electrically connected at 62" to the positive terminal of the electrical system of the engine or other device. The lower end of rod 57 is electrically and mechanically connected by means of a plate 49 to the lower end of ground rod 59 which, in turn, is mechanically and electrically connected at its upper end to reservoir cover 55. Reservoir cover 55 is electrically connected through terminal 68" to the negative side of the engine's electrical system through chassis ground.

Float member 60" is formed into a cylindrical shape in the embodiment illustrated to match the shape of reservoir 12". Openings 71 and 73 are provided to allow the passage therethrough of resistance rod 57 and ground rod 59, respectively. A portion 81, 81' has been milled out of each side of float 60" to accept and carry the electrical contact member 65 therein. As float 60" moves up or down with the level of oil in the pan, one formed portion 64 of terminal member 65, carried by the cutout 81, electrically contacts the wire of resistor 58 while another formed portion 66, carried by the cutout 81', remains in constant contact with ground rod 59, thereby effectively shorting out all the lower portion of resistor 58. The maximum value of resistor 58 can be felt between output terminal 62" and ground (terminal 68") when float 60 is at the bottom of its travel. Terminal 68" is connected to the negative side of the vehicle's electrical system through chassis ground.

Figure 9:
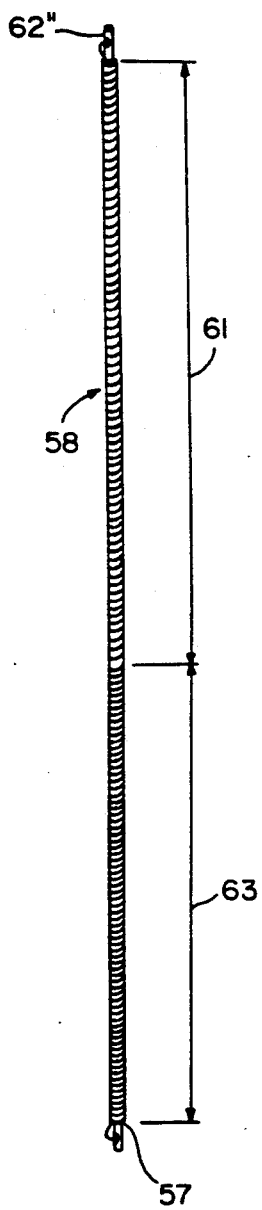
FIG. 9 is an elevational view of a variable resistor for use in the reservoir.

A primary feature of the device of the present invention, illustrated in FIG. 9, is the way in which the resistance wire is wrapped around rod 57 to form the fixed resistor 58. An upper portion 61 of resistor 58 is preferably wound more loosely than a lower portion 63. For this reason, a selected amount of vertical movement of float 60 about the upper end of resistor 58 will cause little or no variation in the resistance felt at the output at 62. This feature aids in compensating for the differences between an indication of "full" when an engine is running, with a quantity of oil distributed throughout the lubricating system, and the same "full" indication when the engine is not running.

Further, in order for the gauge 70 (when reservoir 12" is connected up as shown in FIG. 5) not to reflect a loss of circulating oil from the oil pan, when the engine is started, the float 60", both as to its size and materials, and the frictional resistance of terminal 65 on resistor 58 and ground rod 59 are calculated such that the float does not drop when an amount of oil corresponding to that circulating in the engine is removed from the pan, but will only start moving down when a greater amount of oil is removed representing a true loss of oil (due to use or leakage) from the engine. Thus, referring to FIG. 10, level A represents the full level of oil in reservoir 12" before the engine is started while level B represents the oil level with the engine running. Due to the built-in resistance of the float, it will not move down in the reservoir through this change in oil level. With a further drop in the oil level, however, representing a true loss of oil from the engine, the resistance is overcome and the float moves down. When the engine is again turned off and the level of oil is again increased in the reservoir similar resistance is encountered and the gauge indication again remains substantially unchanged The resistor is also wound so that slight variations in oil level due to changes in engine RPM or bumping and the like should the vehicle traverse rough terrain, will not be reflected on the gauge.

The resistor is wound in such a manner that from the Add position on gage 70, (or Ohm's resistance of 105 ohm's for example) to the Full or Safe position, (or 33 ohm's) the distance and ohm's resistance is calibrated to slow the movement of the pointer on the gauge, so as not to show sudden movement such as, cornering or quick up and down movement on various vehicles. From the Add position, 105 ohm's, to Low or Empty, 240 ohm's, the resistor is wound closely, so that movement is shown quickly. The ohm resistance values of 33 ohm's to 240 ohm's are not critical numbers, it is the difference between them of 207 ohm's which is more critical. Variable resistors other than wire-wound resistors can also be used. For example a variable resistance rod can also be produced by a coating process. The float may have an inserted weight 60a (FIG. 7) and the float material along with the weight inserted in the float combined with the tension of the contacts is the reason for the float to maintain its altitude while the level of oil changes during engine starts and stops. The proper combination of such factors, for the bouyancy of the oil or other liquid being monitored can be obtained empirically in order to obtain the required resistance to movement of the float.

Reverting to the structure illustrated in FIG. 6, the cover 55 has a vent fitting 52' corresponding with fitting 52 in FIG. 1. Also, the cover has peripheral grooves 86, 88 for a sealing ring and spring clip to retain the cover sealed on the reservoir. A slit 90 in the reservoir provides access to the spring clip for removal of the cover. In addition to the cover, the reservoir will also be provided with a base (not shown) of like design to the cover and incorporating an oil inlet connector equivalent to connector 38 shown in FIG. 1. The base will also be retained on the bottom of the reservoir by means of a spring clip, and there will also be a similar sealing ring.

FIG. 11 shows a bracket assembly 90 by which a cylindrical reservoir, such as reservoir 12' (FIG. 3) or reservoir 12" (FIG. 6) can be mounted on an engine block in the manner shown in FIG. 4. The bracket structure comprises an inverted L-shaped post 92 having a mounting slot 94 in its upper horizontal ledge 94, for mounting on a suitably located engine block flange, and a U-shaped rod 98 with threaded ends welded to its vertical limb 100. A U-shaped retainer 102' is carried on the rod and can be tightened around a reservoir 12' or 12" placed between the rod and the retainer by nuts 104. Clearly, the height of the reservoir can be adjusted by up or down movements relative to rod 98 prior to tightening the retainer.

FIGS. 12 and 13 show an arrangement in which the reservoir 12''' for an oil level monitoring system as previously described is mounted internally in an oil pan or engine crankcase 14'''. The internal working parts of the reservoir are similar to those described in relation to FIGS. 6–11, namely there is a float 60''' mounted for up and down movement on a variable resistor rod 58''' and a ground rod 59''' by means of a spring contact (not shown but like contact 65 of the previous embodiment). At the bottom of the reservoir, the rods 58''' and 59''' are connected by a plate 49''' as previously and terminals equivalent to terminals 62'' and 68'' of the previous embodiment extend through a sensor plug-in 106.

An upper air vent 108 is provided in the reservoir to communicate with air in the engine crankcase above the normal oil level, and an oil inlet 110 communicates with the crankcase for oil supply. To mount the reservoir, a portion of the side wall of the crankcase is cut away and replaced with a plate 112 carrying the reservoir.

The arrangement shown in FIGS. 12 and 13 is simplified compared with the previous embodiment insofar as no oil or air leads are required connecting the reservoir to the crankcase. Operation of the device, however, is substantially the same as that previously described including inertia of the float to compensate for oil level differences when the engine is respectively stopped and running. For all embodiments, it is advantageous for the reservoir to be mounted substantially at the longitudinal mid-point of the oil pan where the oil level remains substantially constant during pivotal movements.

Figure 14:
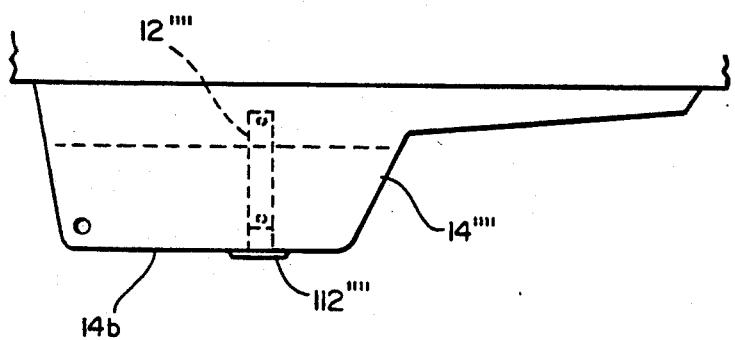
FIG. 14 is a diagrammatic side elevational view of an engine oil pan showing another form of internally mounted reservoir.
Figure 15:
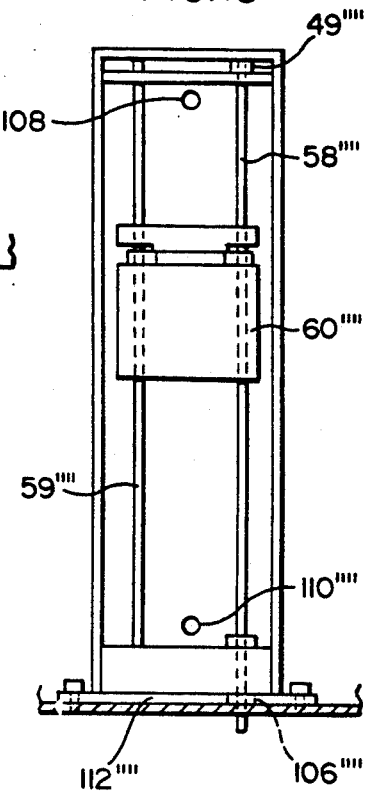
FIG. 15 is an enlarged sectional view of the reservoir shown in FIG. 14.

FIGS. 14 and 15 show another internally mounted reservoir arrangement similar to that shown in FIGS. 12 and 13. In this case, reservoir 12'''' is mounted through the base 14b of crankcase 14'''' and is effectively inverted as compared with the previous arrangement. Like references are used to denote like parts and it will be appreciated that the apparatus operates in like manner to the previous embodiments.

It is advantageous for the device to be calibrated with reference to the "Add" level on the oil gauge since this effectively allows the device to be used on different size engines which have different oil pan capacities and different quantities of oil in circulation.

Figure 16:
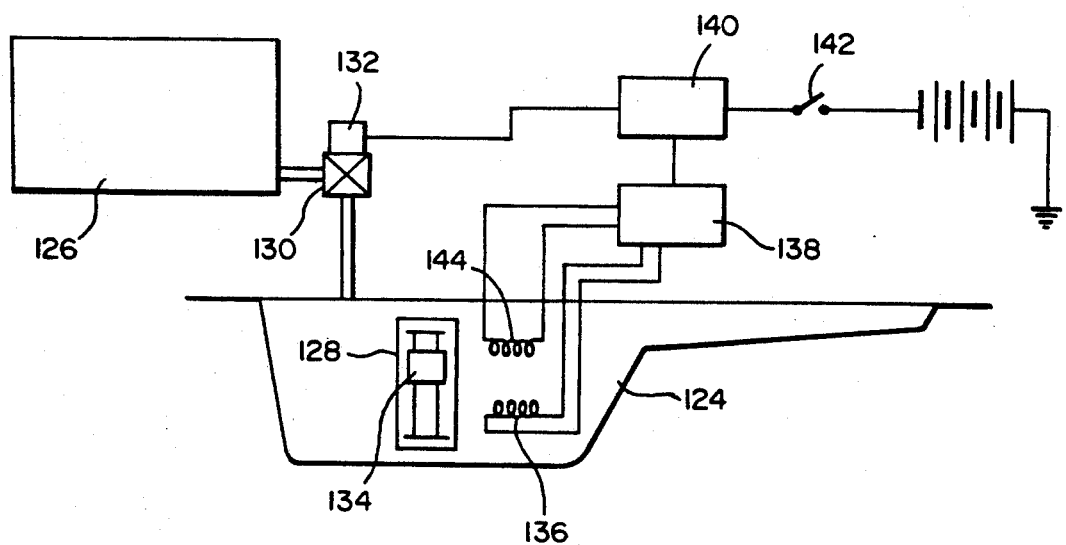
FIG. 16 is a diagrammatic view of a system for automatically topping up an engine oil pan with oil, using monitoring apparatus according to the invention.

FIG. 16 shows an adaptation of the monitoring apparatus for use in automatically topping up an engine oil pan when the oil level falls, for example, to the "Add" level on the gauge. In this arrangement, the oil pan 124, which may be the oil pan of a commercial vehicle engine, is provided with an auxiliary oil supply tank 126, for use in topping up the oil pan. An oil monitoring apparatus 128, for example, of the type shown in the previous figures is provided on the oil pan. Flow from the tank 126 into the oil pan is controlled by a valve 130 opened and closed by a solenoid 132. When the float 134 falls to a level corresponding to the add level, it activates a first proximity coil 136 which through any known form of control circuit 138, and power circuit 140, closes a switch 142 connected in circuit with the engine battery to activate solenoid 132 and open valve 130 thereby admitting oil from tank 126 to the oil pan. Topping up with oil continues, until the float 134 activates a second upper proximity coil 144 (positioned at the Full level) to open switch 144 thereby causing the solenoid to close valve 130 and terminate the oil supply from tank 126.

Instead of using proximity coils 136 and 144, it will be appreciated that valve 130 could also be operated directly from the oil gauge.

Another use for oil monitoring apparatus in accordance with the invention is in conjunction with an information storage system for engine data useful in compiling service records and the like. In this arrangement, for example, the oil monitoring apparatus may be adapted to provide regular readings of oil level to a storage medium such as a computer chip or the like for subsequent retrieval and use in monitoring engine performance.

While preferred embodiments of a device constructed in accordance with various features of the present invention has been shown and described herein, no attempt has been made to limit the device to such description. Rather, such description has been intended to embody all possible variations and alternate constructions falling within the spirit and scope of the invention as defined in the appended claims.

Accordingly, this invention is limited only by the claims appended hereto, and their equivalents, when taken in combination with the complete description contained herein.

I claim:

1. A float actuated oil level monitoring apparatus for providing a continuously variable analog indication of oil level in an oil pan of an engine having a lubricating system, the apparatus comprising:
   a reservoir having a top and a bottom portion, said reservoir having means to secure same relative to said oil pan such that oil level in said reservoir continuously corresponds with oil level in said oil pan;
   first means for providing fluid communication between said bottom portion of said reservoir and said oil pan proximate its bottom;
   second means for providing fluid communication between said top portion of said reservoir and the atmosphere above said oil level in said oil pan;
   a float of selected material, size, and shape, together with an electrical element, disposed within said reservoir, and a contact associated with said float engaging said element whereby electrical characteristic of said element continuously varies as a function of changes in the level of oil in said reservoir as determined by the position of said float, said float and associated electrical contact having a frictional resistance to movement due to oil level changes in said reservoir caused by operation and non-operation of said lubricating system for compensating for the differences in indicated oil quantity between conditions of an operating lubricating system and a non-operating lubricating system, said float member being of a selected material, shape, and size and said contact providing frictional resistance for cooperating with said element to accomplish said compensating.

2. Apparatus according to claim 1 further including: electrical circuit means connected to said resistor, including electrical display means and an electrical power source, whereby said electrical display means provides a continuously variable visual indication of the changes of resistance of said resistor due to changes of said oil level in said reservoir greater than changes brought about by operation and non-operation of said lubricating system, said resistance of said resistor serving to represent said oil level in said reservoir.

3. The float actuated resistive oil level monitoring apparatus of claim 2 wherein said electrical display means comprises a calibrated current meter and said electrical power source comprises said battery of said vehicle.

4. The float actuated resistive oil level monitoring apparatus of claim 5 wherein said electrical display means further comprises at least one visible emergency low-level warning device.

5. The float actuated resistive oil level monitoring apparatus of claim 2 wherein said electrical display means further comprises at least one audible emergency low-level warning device.

6. The float actuated resistive oil level monitoring apparatus of claim 1 wherein said reservoir has means for mounting same externally on the oil pan, said first means for providing communication comprising first hose connector means and said second means for providing communication comprising second hose connector means.

7. The float actuated resistive oil level monitoring apparatus of claim 6 further including bracket means for mounting the reservoir in vertically adjustable position relative to the oil pan.

8. The float actuated resistance oil level monitoring apparatus of claim 1 wherein said reservoir has means for mounting same internally in the oil pan, said first and second means for providing communication comprising respective openings in the reservoir.

9. The float actuated resistive oil level monitoring apparatus of claim 1 wherein the resistor comprises an elongate rod wound with resistance wire and connected at one end to a parallel ground rod, the float being vertically slidable on said rods and the contact comprising a spring element mounted in the float and engaging both said rods.

10. The float actuated resistive oil level monitoring apparatus of claim 9 wherein the resistor has first and second portions and the resistance of said wire differs in said portions at a different rate per linear dimension.

* * * * *